United States Patent [19]

Boone et al.

[11] 4,374,628
[45] Feb. 22, 1983

[54] JOINT FOR SECURING A SICKLE DRIVE PIN

[75] Inventors: Jerry C. Boone; Richard L. Randall, both of Independence, Mo.

[73] Assignee: Allis-Chalmers Corporation, Milwaukee, Wis.

[21] Appl. No.: 188,770

[22] Filed: Sep. 22, 1980

[51] Int. Cl.³ .............................................. F16C 11/00
[52] U.S. Cl. .................................. 403/162; 280/95 A
[58] Field of Search ............... 403/161, 162, 163, 147; 280/95 A

[56] References Cited

U.S. PATENT DOCUMENTS 1,153,986 9/1915 Whitney ................................ 403/147
1,554,520 9/1925 Prilipp et al. ......................... 403/147
3,424,014 1/1969 Harris .............................. 403/161 X

FOREIGN PATENT DOCUMENTS 283965 11/1952 Switzerland ...................... 280/95 A Primary Examiner—Andrew V. Kundrat
Attorney, Agent, or Firm—Charles L. Schwab

[57] ABSTRACT

A pivot joint between a crop cutting sickle (13) and an offset drive arm (12) includes a pivot pin (37) which is connected to the sickle by antifriction bearings (23) and to the sickle drive arm (12) by a tapered wedging sleeve (43). Both ends of the pin (37) are threaded to receive nuts (57,58) which, when tightened, insure a tight joint which does not become loose when subjected to the reversing shock loads encountered in a crop cutting operation.

9 Claims, 4 Drawing Figures

JOINT FOR SECURING A SICKLE DRIVE PIN

FIELD OF THE INVENTION

This invention relates to a crop cutting mechanisms and more particularly to a joint for securely fastening a sickle drive pin to a sickle drive arm.

BACKGROUND OF THE INVENTION

Heretofore the joint for connecting a crop cutting sickle to its drive arm has been effected by a pivot pin or bolt whose shank extends through a bore in the drive arm and also through the inner raceways of a pair of aligned antifriction bearings carried by the sickle bar. In such prior constructions, the connection between the pivot bolt and the drive arm relies primarily on friction achieved by the axial clamping force, produced by tightening the nut on the pivot bolt, to resist side-to-side movement between the drive arm and the pivot bolt. If the bolt loosens to any appreciable extent, the connection between the bolt and arm becomes loose and a rapid deterioration of the joint occurs.

BRIEF SUMMARY OF THE INVENTION

The joint of the present invention is ideal for connecting the sickle bar of a harvestor sickle to a driving arm particularly where the sickle bar and the driving arm are offset members. The configuration of the invention may include a cylindrical pin having threads on each of its axially opposite ends and a shank portion which extends through antifriction bearing means connecting the pin to one of the offset sickle and driving arm members and through a conically shaped opening in the other member. An axially tapered wedging sleeve is disposed within the conical opening and has inward and outward facing surfaces in confronting relation, respectively, to the pin and conical surface of the opening. Means are provided to place one end of the sleeve in axial thrust transmitting relation to the inner raceway of the antifriction bearing means. A pair of threaded fastening members engage the threaded ends of the pin and are operable to draw the members toward one another thereby securely driving the wedging sleeve into the conical opening and into firm engagement with the shank of the pin. The fastening members also securely hold the inner raceway of the bearing in thrust transmitting relation with an axial end of the sleeve.

DETAILED DESCRIPTION OF THE DRAWINGS

Figure 1:
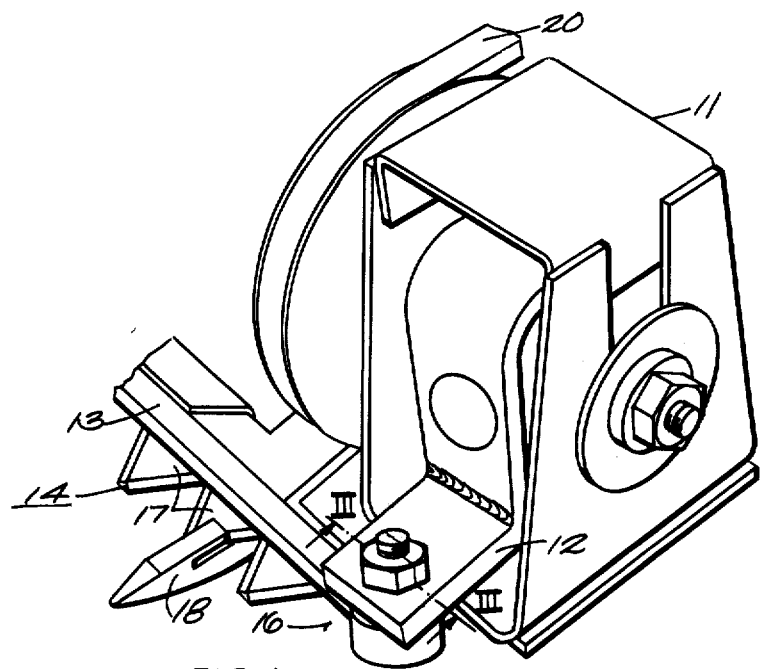
FIG. 1 is a perspective view of a sickle drive mechanism in which the present invention is incorporated.

Referring to FIG. 1, a wobble drive mechanism 11 driven by a belt 20 has an oscillating output arm 12 connected by a unique pivot joint 16 to an offset sickle bar 13 of a sickle 14 on an axis 15 transverse to the direction of reciprocation of the sickle. The sickle 14 also includes knives 17 secured to the sickle bar 13 which effect cutting of the crop through their cooperation with the ledger plates on guards 18.

Figure 4:
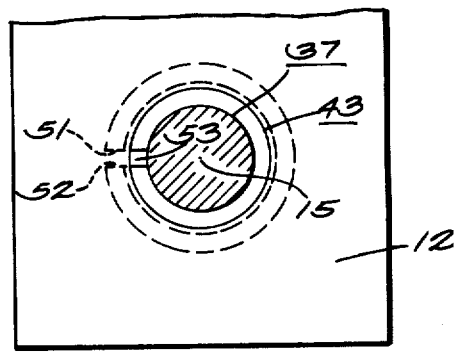
FIG. 4 is a section taken along the line IV—IV in FIG. 3.
Figure 3:
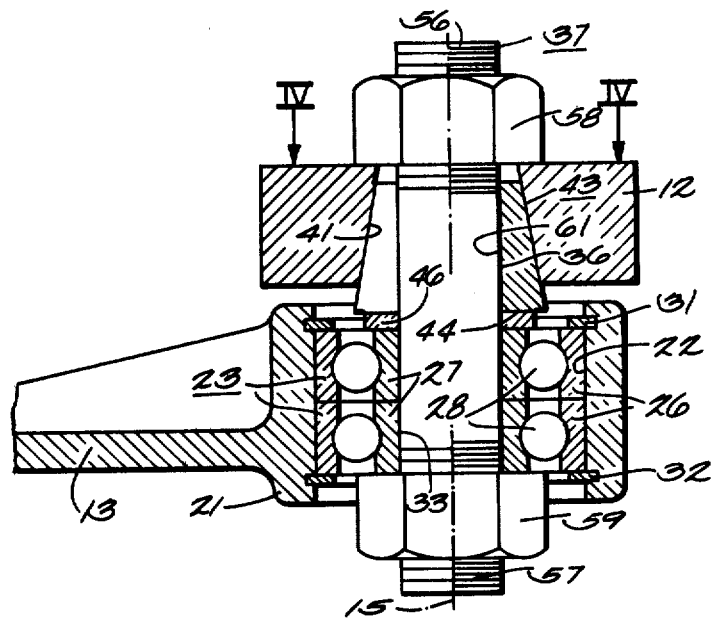
FIG. 3 is a section taken along the line III—III in FIG. 1.

Referring also to FIGS. 3 and 4, the sickle bar 13 has a bearing mounting portion 21 on its driven end which presents a cylindrical opening 22 for receiving a pair of side-by-side antifriction bearings 23. The axially aligned antifriction bearings 23 each include a radially outer raceway 26, a radially inner raceway 27 and antifriction bodies in the form of balls 28. The bearings 23 are held in the sickle bar opening 22 by snap rings 31 and 32. The inner raceways 27 of the bearings 23 are in axial abutment with one another and have inward facing cylindrical surfaces 33 which have a relatively close fit with the cylindrical shank 36 of a pivot pin 37. The drive arm 12 of the wobble drive 11 has wall means presenting a conical opening defined by a conical surface 41 which diverges in the direction toward the bearings 23. A tapered sleeve 43 is disposed between the conical surface 41 and the cylindrical shank 36 of pin 37 and the lower end surface 44 of the sleeve 43 is in thrust transmitting relation to the inner raceway 27 of the upper bearing 23 by virtue of its axial engagement with the upper surface of a wahser 46 whose bottom surface is in thrust transmitting engagement with the inner raceway of the upper bearing 23.

As shown in FIGS. 3 and 4, the conical sleeve 43 is an axially split sleeve having circumferentially confronting surfaces 51 and 52 defining a gap 53 interrupting the circumferential continuity of the sleeve 43. The opposite ends of the pin 37 have threads 56 and 57 which are engaged by suitable threaded fastening means in the form of nuts 58, 59, respectively.

Figure 2:
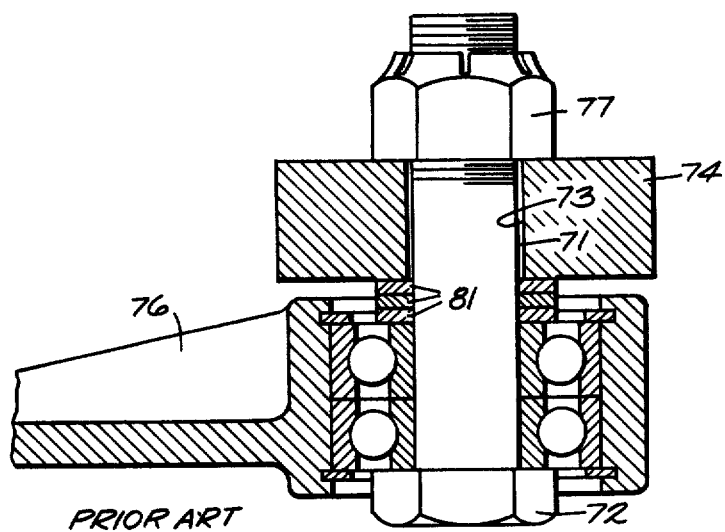
FIG. 2 is a section through a sickle drive pin joint of the prior art.

In the prior art construction shown in FIG. 2, the shank 71 of a bolt 72 has a close clearance fit in bore 73 of the drive arm 74. Side-to-side movement of the drive arm 74 and sickle 76 is resisted by the friction of the clamping force generated by tightening the nut 77. Upon occurrence of high shock loads, side slip may occur resulting in loss of bolt preload. When this occurs, there is rapid increase in wear and looseness.

In the present invention, the tapered sleeve insures a rigid, tight connection between the pin 37 and the drive arm. When the upper nut 58 is tightened, the friction between the inward facing cylindrical surface 61 of the sleeve 43 and the pin shank 36 may prevent the inner raceway 27 from being firmly secured against the lower axial end of the sleeve 43. However, by tightening the lower nut 59, the inner raceway 27 is brought into firm axial thrust transmitting relation with the lower end of the sleeve 43. When assembling the joint of the present invention, the nuts 58, 59 are threaded onto both ends of the pin 37. The upper nut 58 is tightened and then a final tightening of the joint is achieved by tightening the lower nut 59. Since there is no side clearance between the pin 37 and the sleeve, side movement will not occur when shock loads occur in a crop cutting operation. The sleeve 43 extends downwardly beyond the arm 12 toward the bearings 23 thereby eliminating two of the three thrust washers 81 of the prior art construction. This added support for the pin 37 reduces bending movement of the pin thereby providing additional stiffness to the joint.

When the sleeve 43 is stuck tightly in the tapered opening of the drive arm 12, disassembly would be expected to be somewhat difficult, however, by loosening the lower nut 59, some of the axial thrust is removed from the joint and disassembly is made less difficult.

The embodiments of the invention in which an exclusive property or privilege is claimed are defined as follows:

1. A joint for pivotally connecting a reciprocating sickle member to its offset driving member for transmission of force in the direction of reciprocation characterized by a cylindrical pin having threads on at least one of its axially opposite ends, and disposed on an axis transverse to the direction of reciprocation of said sickle member, bearing means connecting said pin to one of said members having radially inner and outer bearing elements, wall means in said other member presenting a conical surface defining a conically shaped opening aligned with and surrounding said pin, axially tapered wedging sleeve disposed within said opening having radially inward and outward facing surfaces in confronting relation to said pin and conical surface, respectively, means independent of said pin and one member placing said sleeve in axial thrust transmitting relation to said inner bearing element, a threaded fastening member in threaded engagement, respectively, with said threads on said one end of said pin and in axial thrust transmitting relation to said other member, and axial thrust transmitting means on the other end of said pin in axial thrust transmitting engagement with said inner bearing element.

2. The joint of claim 1 wherein said sleeve is axially split.

3. The joint of claim 2 wherein said sickle member is said one member.

4. The joint of claim 3 wherein said means placing said sleeve in axial thrust transmitting relation to said inner bearing element includes a thrust washer on said pin axially between said inner bearing element and said sleeve.

5. The joint of claims 1, 2, 3, or 4 wherein said outward facing surface of said sleeve is a conical surface diverging axially in the direction toward said bearing means.

6. The joint of claims 1, 2, 3 or 4 wherein said pin is threaded on both its ends and said axial thrust transmitting means is a threaded fastening member in threaded engagement with said threads on the other end of said pin and in axial thrust transmitting relation to said inner bearing element.

7. A pivot joint for connecting a reciprocating sickle to an offset drive arm characterized by a cylindrical pin having threads on each of its axially opposite ends, bearing means connecting said pin to said sickle having radially inner and outer raceway means and rolling antifriction bodies between said raceway means, wall means in said drive arm presenting a conical surface defining a conically shaped opening aligned with and surrounding said pin, axially tapered wedging sleeve disposed within said opening having radially inward and outward facing surfaces in wedging engagement with said pin and conical surface, respectively, means independent of said pin and one member placing said sleeve in axial thrust transmitting relation to said inner raceway means, a pair of threaded fastening members in threaded engagement, respectively, with said threads on said ends of said pin and in axial thrust transmitting relation to said drive arm and inner raceway means, respectively.

8. The pivot joint of claim 7 wherein said bearing means include a pair of aligned antifriction bearings with axially abutting inner raceways.

9. The pivot joint of claim 7 wherein said sleeve is axially split.

* * * * *